Figure 1:
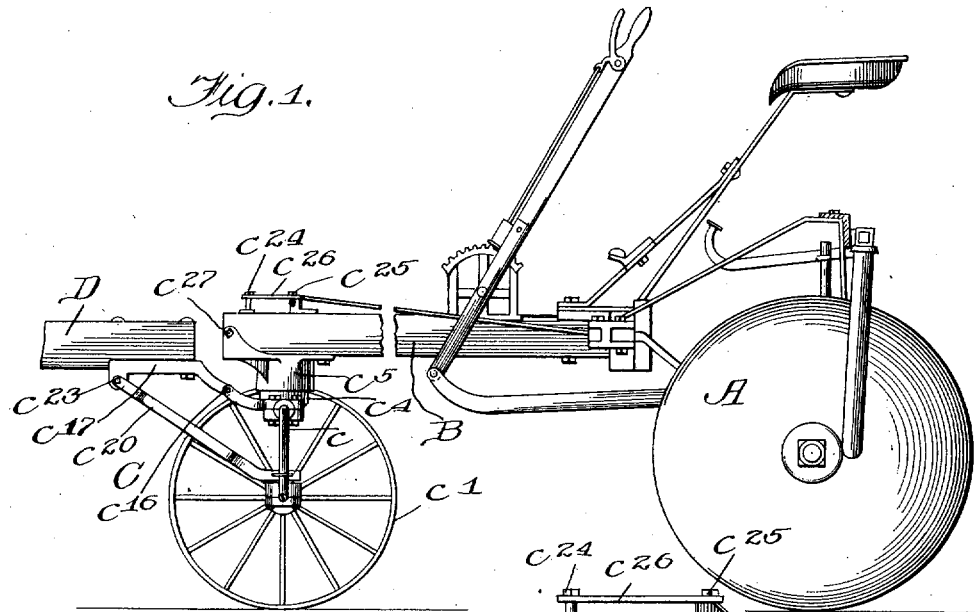

W. E. JOHNSON.
FORE CARRIAGE FOR AGRICULTURAL IMPLEMENTS.
APPLICATION FILED FEB. 25, 1907.

1,018,390.

Patented Feb. 20, 1912.

4 SHEETS—SHEET 1.

W. E. JOHNSON.
FORE CARRIAGE FOR AGRICULTURAL IMPLEMENTS.
APPLICATION FILED FEB. 25, 1907.
1,018,390.
Patented Feb. 20, 1912.
4 SHEETS—SHEET 2.
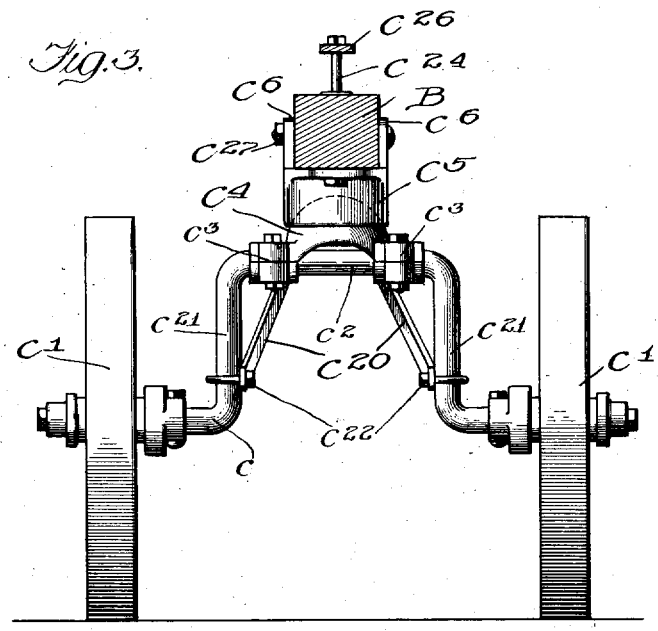
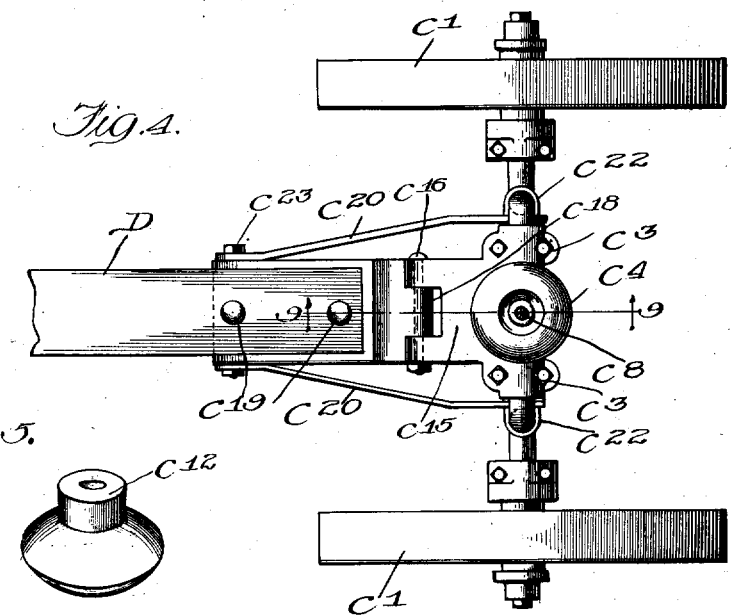
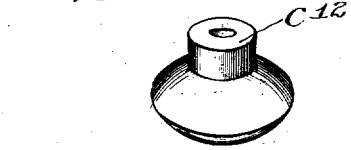

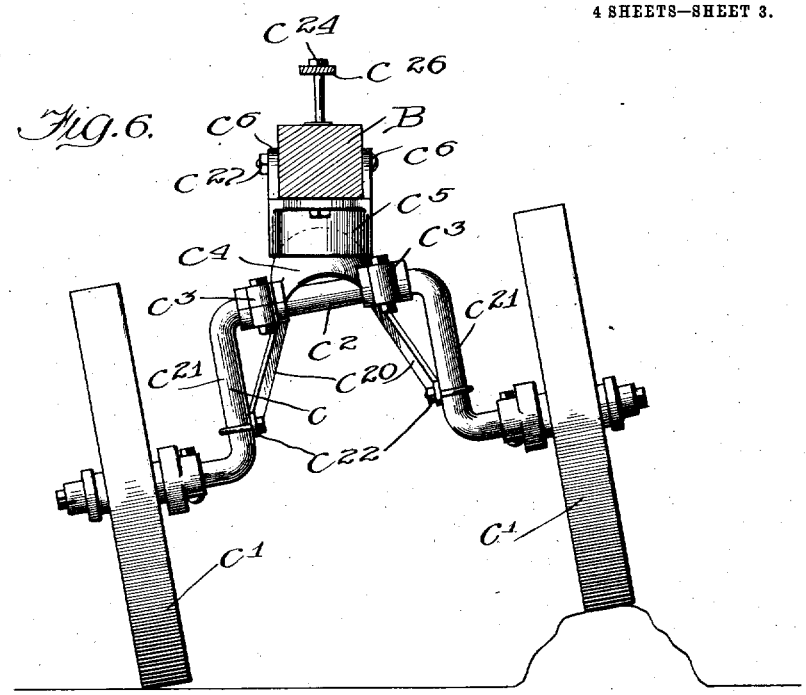
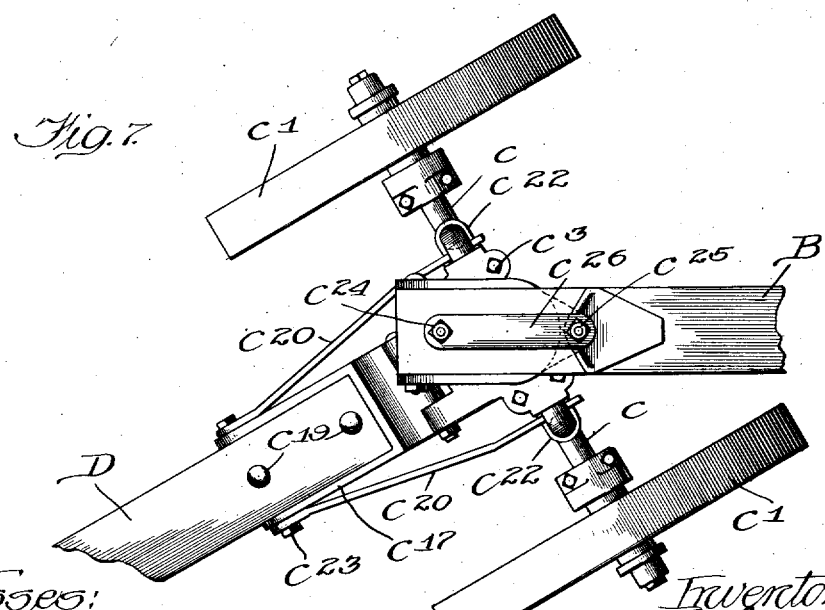

W. E. JOHNSON.
FORE CARRIAGE FOR AGRICULTURAL IMPLEMENTS.
APPLICATION FILED FEB. 25, 1907.
1,018,390.
Patented Feb. 20, 1912.
4 SHEETS—SHEET 4.
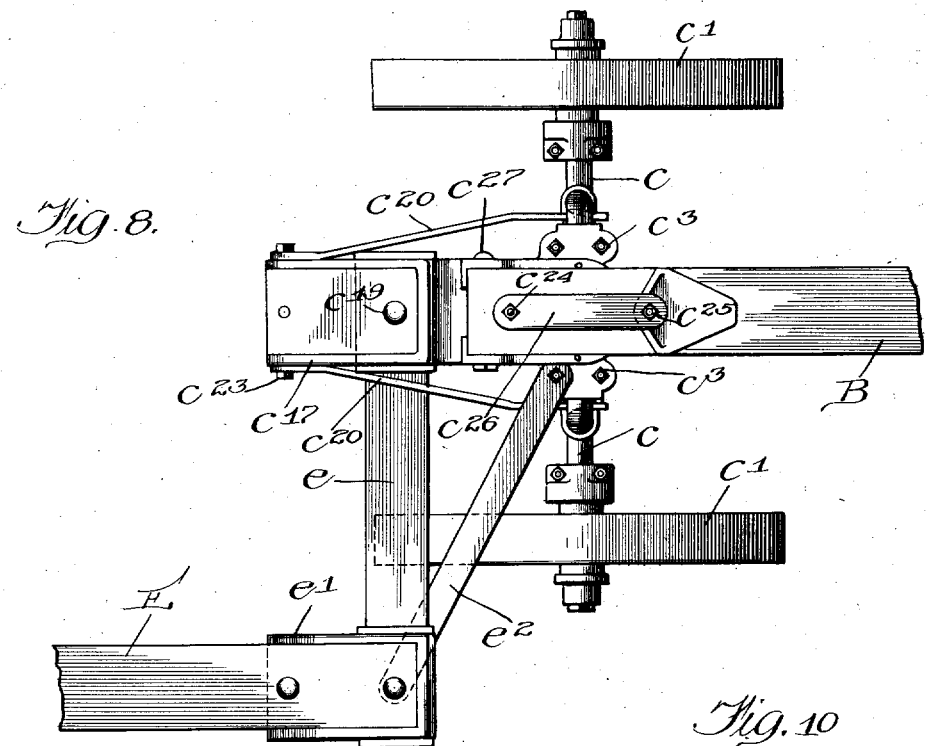
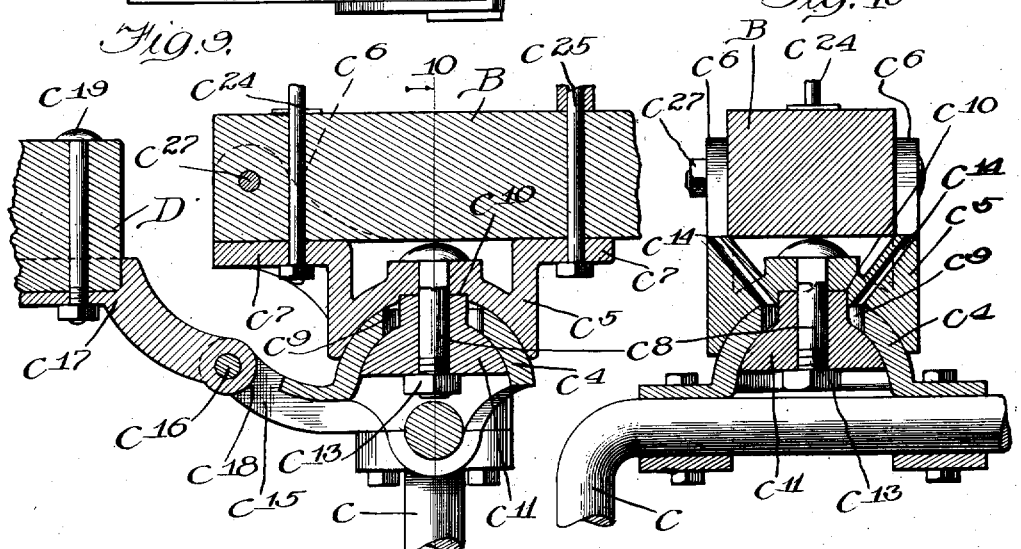

UNITED STATES PATENT OFFICE.

WILLIAM E. JOHNSON, OF ROCK ISLAND, ILLINOIS, ASSIGNOR TO ROCK ISLAND PLOW COMPANY, OF ROCK ISLAND, ILLINOIS, A CORPORATION OF ILLINOIS.

FORE CARRIAGE FOR AGRICULTURAL IMPLEMENTS.

1,018,390. Specification of Letters Patent. Patented Feb. 20, 1912.

Application filed February 25, 1907. Serial No. 359,068.

*To all whom it may concern:*

Be it known that I, WILLIAM E. JOHNSON, a citizen of the United States of America, and resident of Rock Island, Illinois, have invented a certain new and useful Improvement in Fore Carriages for Agricultural Implements, of which the following is a specification.

My invention relates to fore-carriages adapted more particularly for use in connection with disk harrows, drills and other similar agricultural implements.

Objects of my invention are the provision of an improved and highly efficient fore-carriage, which can be readily attached to the stub tongue of a disk harrow or drill or other implement; which will not be likely to turn over and drag with one wheel flat on the ground and the other up in the air, when one wheel drops into a hole, or while making a sharp turn with the harrow or cultivator or other implement; which will be strong and serviceable, and which will not tend to weaken the implement to which it is attached; which will not produce flopping and pounding of the pole, and which will reduce the neck weight on the horses, without developing other things which might be even more objectionable; which will not tend to change the suction of the disk blades of the harrow or other implement, nor interfere in any way with the proper working of the same; which will permit the evener to be carried on the stub tongue of the implement, so that no pulling strain will be communicated to the pole between the horses; which will prevent the long pole from getting into any position where it can act as a lever to break the castings of the truck; which will prevent dust and dirt from lodging between the castings of the truck, by the use of a cup-and-saucer bearing in the coupling between the axle and the stub tongue; which will permit the fore-carriage to straddle a corn row without clogging the castings thereof, and which will also prevent similar clogging when one or both of the wheels drop into a hole; which will prevent the fore-carriage from knocking down the corn, and which will prevent the wheels of the fore-carriage from running on the corn when the team moves slightly to either side; which will permit either wheel to pass under the stub tongue when making a turn, and which will permit either wheel to rise over an obstruction without affecting the other, or without danger of the fore-carriage rolling over with one wheel down and the other up; which will brace the axle of the fore-carriage without attaching braces to the pole; and to provide certain details and features of improvement and combinations tending to increase the general efficiency of a fore-carriage of this particular character and for this particular purpose.

To the foregoing and other useful ends, my invention consists in matters hereinafter set forth and claimed.

Figure 2:
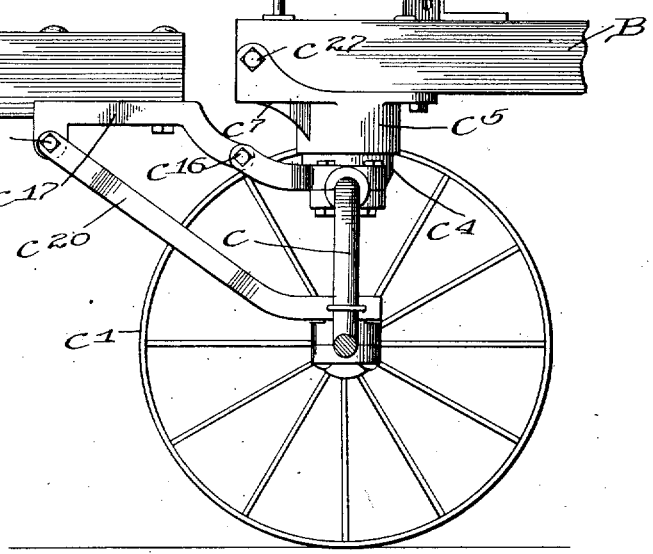

In the accompanying drawings: Figure 1 is a side elevation of a disk harrow with a fore-carriage embodying the principles of my invention connected thereto. Fig. 2 is an enlarged side elevation of the said fore-carriage, the near wheel being removed for convenience of illustration. Fig. 3 is a rear elevation of the fore-carriage shown in Fig. 2. Fig. 4 is a plan of the said fore-carriage with the upper portion of the bearing or coupling removed, for convenience of illustration. Fig. 5 is a detail perspective view of the convex washer by which the cup is held in the saucer of the coupling between the axle and the stub tongue. Fig. 6 is a view similar to Fig. 3, showing the right-hand wheel rising over an obstruction. Fig. 7 is a plan of the fore-carriage shown in Fig. 2, showing the axle skewed around to one side. Fig. 8 is also a plan view of the said fore-carriage, illustrating the adaptation of the pole-plate for connection with an off-center pole. Fig. 9 is an enlarged section through the castings of the fore-carriage and adjacent parts on line 9—9 of Fig. 4. Fig. 10 is a vertical section on line 10—10 in Fig. 9.

Referring to Fig. 1, the disk harrow A may be of any suitable known or approved construction. It will also be understood that some other implement, such as a cultivator or drill, may be employed instead. The stub tongue B is of the usual or any ordinary form, and is connected with the frame of the harrow in any desired manner. The fore-carriage C comprises a bail-shaped crank-axle $c$ having its ends provided with spindles upon which are mounted the supporting wheels $c^1$. The said axle has its upper or horizontal portion $c^2$ mounted in split bearings $c^3$, which are carried by the cup $c^4$. It will be seen that this cup is adapted to engage the under concave socket of the saucer $c^5$, which latter is provided with ears $c^6$ and horizontal flanges $c^7$ by which it is secured to the under side of the stub tongue B. As shown, the said saucer is provided centrally with a king-bolt $c^8$, the head of which is prevented from rising by the lower surface of the stub tongue, as shown more clearly in Figs. 9 and 10. The said cup $c^4$ is provided centrally with an aperture $c^9$, and the said saucer is also provided centrally with a seat $c^{10}$ of less diameter than the said aperture $c^9$. A convex washer $c^{11}$ engages the lower concave surface of the cup $c^4$, and is provided with a boss $c^{12}$ which extends through the aperture $c^9$ and fits into the seat $c^{10}$, the three separable elements being held firmly together by the nut $c^{13}$ on the end of the king-bolt.

It will be understood, of course, that the pressure of the said nut clamps the washer tightly to the saucer, but does not clamp the said washer tightly to the cup, thus leaving the latter free to oscillate or shift around in the concave lower surface of the said saucer $c^5$, thus providing a free working joint. Lubricating ducts $c^{14}$ are provided in the cup for lubricating the joint, said ducts leading to the opening $c^9$ in the cup. In this way, the king-bolt bearing is practically open at the bottom, the concave member being on the stub tongue and the convex member being on the axle, thus preventing dirt or dust from lodging between the castings or parts of the bearing. The cup $c^4$ has its forward portion provided with a rigid portion $c^{15}$, which is bifurcated and provided with openings for the pintle $c^{16}$. A pole-plate $c^{17}$ is provided with a lug $c^{18}$ adapted to be engaged in the said bifurcated portion, and adapted to receive the said pintle. In this way, a hinge or swinging connection is provided between the rear end of the pole and the axle, permitting the pole to swing relatively to the cup-and-saucer bearing. The said pole-plate is secured to the pole D by means of bolts $c^{19}$ and braces $c^{20}$ connect the forward portion of the pole-plate with the crank arms $c^{21}$ of the bail-shaped axle. The rear ends of these braces, it will be seen, are connected with the axle by means of clips $c^{22}$, while their forward ends are secured to the pole-plate by a bolt $c^{23}$. With this hinged joint between the pole-plate and the bearing for the axle, the pole will not be liable to get into a position where it can act as a lever to break the castings. This is a great advantage, I find, as the pole is necessarily quite long, and liable to exert a powerful leverage under certain conditions, sufficient to break something were the axle and pole rigidly connected together. Also, it will be seen that the pole-plate $c^{17}$ is practically on a level with the top of the cup $c^5$, which latter serves as a tongue plate for the stub tongue. With this arrangement, the pole and the stub tongue are practically in the same level, and the arrangement does not interfere with the suction of the disks or the proper operation of the harrow or other implement. The bolts $c^{24}$ and $c^{25}$, which secure the cup-and-saucer bearing to the stub tongue, serve also to hold the hammer strap $c^{26}$ in place on the top of the stub tongue. In this way, the evener is hitched to the stub tongue, and the pole D is not subject to any pulling strain, and does not tend to flop or pound between the horses, when the harrow jerks or swings side-wise. Again, it will be seen that the bail-shaped crank-axle is adapted to straddle a corn row or other obstruction, and that with this arrangement the king-bolt bearing is raised well above the ground, so as to prevent it from being clogged with dirt or rubbish. The split bearings $c^3$ are not clamped tightly upon the upper horizontal portion of the axle, but leave the latter free to rock or turn therein, when the tongue swings up and down. It will be seen, therefore, that the axle is adapted to rock or swing back and forth relatively to the stub tongue, and that this results in less tendency toward breakage by the pole. The cup-and-saucer bearing permits the axle to rock around in different directions, as, for example, in the manner shown in Fig. 6. This permits either wheel to ride easily over an obstruction without interfering with the other wheel, and at the same time the motion is limited in all directions by the construction of the cup-and-saucer bearing, and the fore-carriage cannot turn over and drag with one wheel down and the other up.

The attachment of the fore-carriage to the stub tongue is easily accomplished without weakening the harrow or other implement, and without changing the construction except by sawing off the tongue and fastening it to the pole-plate $c^{17}$. The bolts of the hammer strap serve to hold the fore-carriage in place on the stub tongue, and only one additional hole is necessary in the stub tongue for the horizontal bolt $c^{27}$.

In Fig. 8, the pole E is arranged off center, so as to accommodate a three-horse team—two horses on one side of the pole and one horse on the other, thus bringing one horse directly in line with the stub tongue and the center of the truck. This is accomplished by providing the under side of the pole-plate $c^{17}$ with a seat for the transverse bar $e$, by connecting the latter with a supplemental pole-plate $e^1$ to which the said pole is secured. A brace $e^2$ connects the pole-plate $e^1$ with one of the split bearings $c^3$, as shown in Fig. 8. In this way, the pole E is rigidly connected with the pole-plate $c^{17}$, and the off-center arrangement permits the use of a three-horse team.

With the arrangement shown in all of the figures except Fig. 8, it will be seen that the pole D is in line with the stub tongue and that a four-horse team can be employed. Thus, with the arrangement described and shown, my fore-carriage is adapted for either a central or off-center arrangement of the pole, so as to accommodate either a three-horse or a four-horse team. In other words, the bars $e$ and $e^2$ and the supplemental pole-plate $e^1$ constitute a set-over attachment for use in connection with three-horse teams.

By attaching the braces $c^{20}$ to the pole-plate rather than to the pole, the fore-carriage is of a self-contained nature, and does not collapse or fall apart when disconnected from the pole and the stub tongue, the two upper plates being the only portions which are fastened to the pole and the stub tongue.

From the foregoing, it will be seen that I provide an improved and highly efficient fore-carriage, characterized by many advantages over the construction heretofore proposed for devices of this character.

As the bail-shaped axle serves as an arch, the fore-carriage does not knock down the corn, when it straddles a row, and the wide tread or distance between the wheels prevents the fore-carriage from running on the corn when the team swerves or moves slightly to one side.

By the off center attachment, such as shown in Fig. 8, it will be seen that the pole E is so connected with the fore-carriage that the said pole lies outside one of the wheels of the fore-carriage in the manner shown. It will also be seen that such pivotal or hinge connections are provided between the pole and the fore-carriage that the said pole is free to swing up and down relatively to the stub tongue. In addition, the axle is free to rock in its bearings, this rocking or turning movement being about an axis which is above the axis of the wheels, but parallel therewith. In practice, these features are found to be of great advantage, for the reasons explained.

What I claim as my invention is:

1. A fore-carriage comprising a bail axle, wheels on the ends of said axle, bearings in which the bail portion of the axle is free to turn or rock, a pole connected to the axle and adapted to rock the latter in the said bearings when the pole moves up and down, and a swivel bearing for connecting the fore-carriage with a stub tongue, adapted to permit either wheel to rise and fall by tilting the axle in a transverse vertical plane.

2. A fore-carriage comprising a bail-shaped crank-axle, wheels on the ends of said axle, bearings in which the upper horizontal portion of the axle is mounted to oscillate a swivel bearing for connecting the axle with a stub tongue, a pole-plate hinged to the bearings in which the axle is mounted, and braces connecting the pole-plate with the axle.

3. A fore-carriage comprising an axle, wheels on said axle, a swivel bearing for connecting the axle with a stub tongue, adapted to permit either wheel to rise and fall by tilting the axle in a transverse vertical plane, a pole-plate, a hinge connection between the pole-plate and the swivel bearing, permitting the pole to swing up and down relatively to the stub tongue, and braces connecting the axle with the pole-plate.

4. A fore-carriage comprising an axle, wheels on said axle, a swivel bearing for connecting the axle with a stub tongue, a pole-plate, and a hinge connection between the pole-plate and the swivel bearing, to permit the pole to swing up and down relatively to the stub tongue, to control the axle in its bearings said swivel bearing provided with means for permitting either wheel to rise over an obstruction, and also permitting the stub tongue to rock or roll sidewise without affecting the pole.

5. A fore-carriage adapted for attachment to a stub tongue, provided with bearings, an axle free to oscillate therein at a point above the axis of the wheels, and means comprising a pole connection controlling the oscillation of the axle in said bearings.

6. The combination of a stub tongue, a bail-shaped crank-axle, a cup-and-saucer bearing for connecting the axle with the stub tongue, wheels on the ends of said axle, a pole-plate, a hinge connection between the rear end of the pole-plate and the lower member of the said cup-and-saucer bearing, braces connecting the forward end of the pole-plate with the axle, and a pole secured to the pole-plate.

7. A fore-carriage comprising an axle, a swivel bearing for connecting the axle with a stub tongue, said swivel bearing adapted to permit either end of the axle to rise, wheels on said axle, a pole-plate adapted to support a pole in the same or substantially the same level as the stub tongue, and a hinge connection between the rear end of the pole-plate and the swivel bearing.

8. A fore-carriage comprising wheels, an axle providing a clear space between and extending considerably above the hubs of the wheels, an upwardly extending protuberance carried by said axle, a coupling member having a recess or chamber to receive said protuberance, means for securing the coupling member to the stub tongue of an implement, and means for movably connecting a pole with and forward of the fore-carriage.

9. A fore carriage comprising wheels mounted on a bail-shaped axle, bearings on the upper part of said bail, a stub tongue mounted in said bearings, a pole, and a hinge-connection between said bearing and the rear end of said pole and pivoted link connection from said pole to the lower ends of said axle.

Signed by me at Rock Island, Illinois, this 15th day of February 1907.

WILLIAM E. JOHNSON.

Witnesses:
J. H. CRAWFORD,
A. B. FRENIER.